(12) United States Patent
Okano et al.

(10) Patent No.: US 11,688,429 B2
(45) Date of Patent: Jun. 27, 2023

(54) DISK DEVICE HAVING A CONTROL BOARD CLOSING A HOLE IN A HOUSING OF THE DISK DEVICE AND A COMMUNICATION ANTENNA LOCATED INSIDE THE CONTROL BOARD

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Taichi Okano, Yokohama Kanagawa (JP); Jia Liu, Yokohama Kanagawa (JP); Nobuhiro Yamamoto, Yokohama Kanagawa (JP); Kota Tokuda, Fujisawa Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/197,873

(22) Filed: Mar. 10, 2021

(65) Prior Publication Data
US 2021/0407550 A1 Dec. 30, 2021

(30) Foreign Application Priority Data
Jun. 25, 2020 (JP) .................................. 2020-109887

(51) Int. Cl.
*G11B 25/04* (2006.01)
*G11B 33/12* (2006.01)
(Continued)

(52) U.S. Cl.
CPC .............. *G11B 25/043* (2013.01); *G06F 1/26* (2013.01); *G06F 1/266* (2013.01); *G11B 33/121* (2013.01);
(Continued)

(58) Field of Classification Search
None
See application file for complete search history.

(56) References Cited

U.S. PATENT DOCUMENTS 4,818,907 A * 4/1989 Shirotori ................ G11B 33/12
360/99.18
5,282,099 A * 1/1994 Kawagoe et al. ... G11B 33/122
360/99.25
(Continued)

FOREIGN PATENT DOCUMENTS

CN 111193104 A 5/2020
CN 113157608 A 7/2021
(Continued)

OTHER PUBLICATIONS

Related U.S. Appl. No. 17/197,722; First Named Inventor: Jia Liu; Title: "Disk Device", filed Mar. 10, 2021.
(Continued)

*Primary Examiner* — Craig A. Renner
(74) *Attorney, Agent, or Firm* — Holtz, Holtz & Volek PC

(57) ABSTRACT

According to one embodiment, a disk device includes a housing including a hole, a magnetic disk, a control board closing the hole, and an electronic component. The electronic component is mounted on the control board, and assists a control operation for recording and reproducing information on and from the magnetic disk.

12 Claims, 10 Drawing Sheets

(51) Int. Cl.
*H01Q 1/22* (2006.01)
*G06F 1/26* (2006.01)

(52) U.S. Cl.
CPC ......... *G11B 33/122* (2013.01); *H01Q 1/2258* (2013.01)

(56) References Cited

U.S. PATENT DOCUMENTS

| | | | |
|---|---|---|---|
| 5,414,574 A | 5/1995 | Boutaghou et al. | |
| 5,481,420 A | 1/1996 | Cardona et al. | |
| 5,650,895 A * | 7/1997 | Koizumi et al. ...... | G11B 25/043 360/99.18 |
| 6,594,107 B2 | 7/2003 | Hayakawa et al. | |
| 7,419,407 B1 | 9/2008 | Jolly et al. | |
| 7,830,317 B2 | 11/2010 | Yamazaki | |
| 10,374,345 B2 | 8/2019 | Yamamoto et al. | |
| 10,594,100 B1 * | 3/2020 | Namihisa et al. ... | G11B 33/122 |
| 10,680,368 B2 | 6/2020 | Yamamoto et al. | |
| 10,903,595 B2 | 1/2021 | Yamamoto et al. | |
| 2003/0080906 A1 | 5/2003 | Miyasaka | |
| 2004/0004145 A1 | 1/2004 | Stamm et al. | |
| 2005/0094312 A1 | 5/2005 | Sato | |
| 2005/0231848 A1* | 10/2005 | Hong et al. .......... | G11B 25/043 360/99.15 |
| 2006/0190669 A1* | 8/2006 | Lee et al. ............ | G11B 25/043 711/4 |
| 2007/0183271 A1 | 8/2007 | Ashizaki et al. | |
| 2008/0055166 A1 | 3/2008 | Kobayashi | |
| 2008/0318447 A1 | 12/2008 | Tomioka et al. | |
| 2009/0135073 A1 | 5/2009 | Yokote et al. | |
| 2009/0322625 A1 | 12/2009 | Yamazaki | |
| 2013/0109317 A1 | 5/2013 | Kikuchi et al. | |
| 2014/0250495 A1 | 9/2014 | Mahanfar et al. | |
| 2018/0097301 A1 | 4/2018 | Yoshida et al. | |
| 2018/0149536 A1 | 5/2018 | Choe et al. | |
| 2019/0304511 A1* | 10/2019 | Hisakuni et al. .... | G11B 25/043 |
| 2019/0378545 A1* | 12/2019 | Sudo et al. .......... | G11B 33/122 |
| 2020/0294546 A1* | 9/2020 | Yamamoto et al. . | G11B 33/122 |
| 2020/0402545 A1 | 12/2020 | Kaneko et al. | |
| 2021/0225412 A1 | 7/2021 | Okano et al. | |
| 2021/0295876 A1 | 9/2021 | Okano et al. | |

FOREIGN PATENT DOCUMENTS

| | | |
|---|---|---|
| EP | 1806747 A2 | 7/2007 |
| JP | H04117693 A | 4/1992 |
| JP | H08115590 A | 5/1996 |
| JP | 2002109864 A | 4/2002 |
| JP | 2003036668 A | 2/2003 |
| JP | 2003273622 A | 9/2003 |
| JP | 2005011458 A | 1/2005 |
| JP | 2007193880 A | 8/2007 |
| JP | 2012182791 A | 9/2012 |
| JP | 2014003653 A | 1/2014 |
| JP | 2018121293 A | 8/2018 |
| JP | 2021149985 A | 9/2021 |
| KR | 200384339 Y1 | 5/2005 |
| KR | 20130011622 A | 1/2013 |
| WO | 2011111782 A1 | 9/2011 |
| WO | 2013144296 A1 | 10/2013 |

OTHER PUBLICATIONS

Related U.S. Appl. No. 17/725,616, First Named Inventor: Jia Liu; Title: "Disk Device", filed Apr. 21, 2022.
Notice of Allowance dated Jan. 24, 2022, issued in related U.S. Appl. No. 17/197,722.
Office Action (Non-Final Rejection) dated Oct. 26, 2022, issued in related U.S. Appl. No. 17/725,616.

* cited by examiner

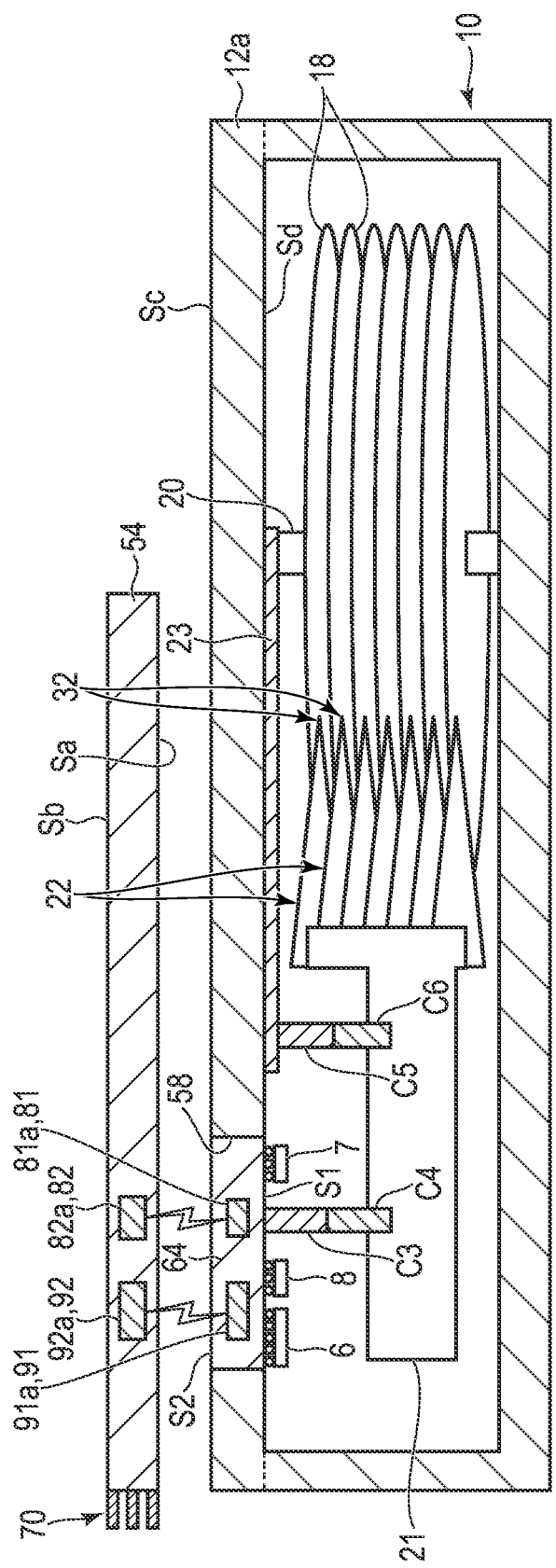
F I G. 5

US 11,688,429 B2

DISK DEVICE HAVING A CONTROL BOARD CLOSING A HOLE IN A HOUSING OF THE DISK DEVICE AND A COMMUNICATION ANTENNA LOCATED INSIDE THE CONTROL BOARD

CROSS-REFERENCE TO RELATED APPLICATIONS

This application is based upon and claims the benefit of priority from Japanese Patent Application No. 2020-109887, filed Jun. 25, 2020, the entire contents of which are incorporated herein by reference.

FIELD

Embodiments described herein relate generally to a disk device.

BACKGROUND

As a disk device, a magnetic disk device comprises a housing comprising a base and a top cover, and a rotatable magnetic disk and an actuator supporting a magnetic head are disposed in the housing. As a method of improving the performance of the disk device, a method of reducing the rotation-al resistance of the magnetic disk and the magnetic head by sealing a low-density gas such as helium in the housing is been proposed.

A through-hole is formed in the housing. In order to maintain airtightness in the housing, the through-hole of the housing is closed by a sealing board. The sealing board is composed of a printed circuit board. The magnetic disk device comprises a control circuit board located outside the housing and fixed to the housing. The control circuit board and the sealing board are connected by a connector. Wired communication can be performed between the control circuit board and a communication unit in the housing by the connector.

BRIEF DESCRIPTION OF THE DRAWINGS

FIG. 5 is a cross-sectional view showing an HDD according to a modification example 1 of the first embodiment.

DETAILED DESCRIPTION

Figure 1:
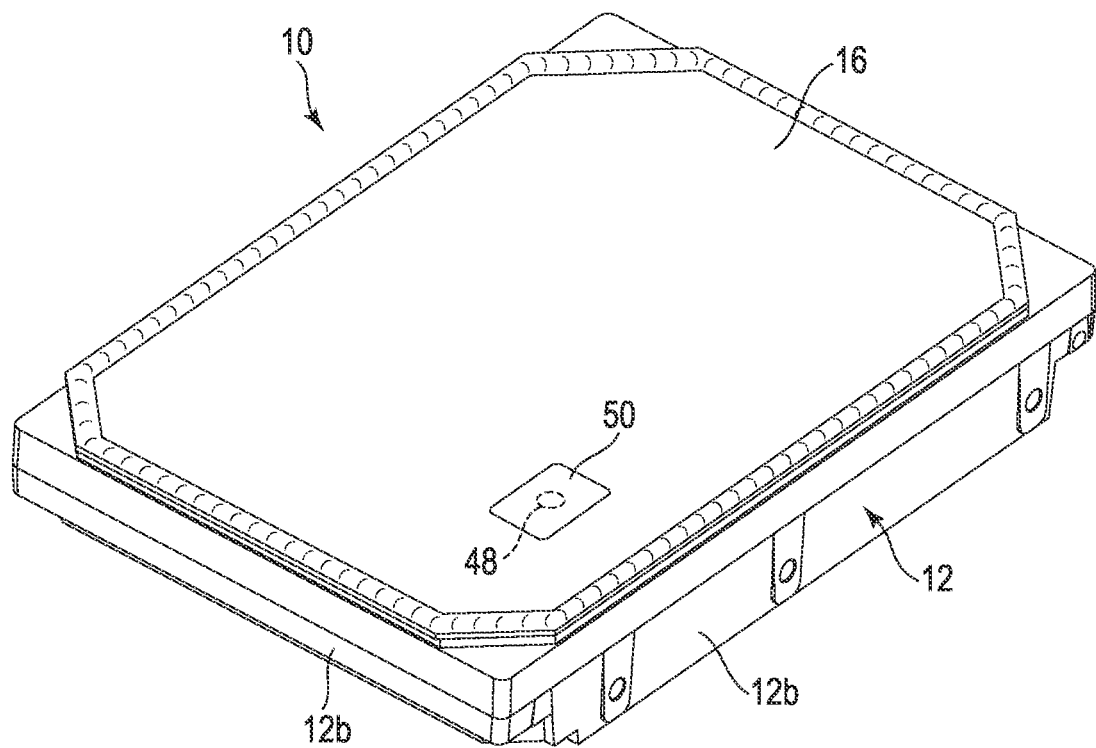
FIG. 1 is a perspective view showing the external appearance of a hard disk drive (HDD) according to the first embodiment.

In general, according to one embodiment, there is provided a disk device comprising a housing comprising a hole, a magnetic disk rotatably disposed in the housing, a control board closing the hole, and an electronic component which is mounted on the control board and assists a control operation for recording and reproducing information on and from the magnetic disk.

According to another embodiment, there is provided a disk device comprising a housing comprising a hole, a magnetic disk rotatably disposed in the housing, a control board closing the hole, and an electronic component mounted on the control board and being other than at least a connector.

Embodiments of the present invention will be described hereinafter with reference to the accompanying drawings. The disclosure is merely an example, and proper changes in keeping with the spirit of the invention, which are easily conceivable by a person with ordinary skill in the art, come within the scope of the invention as a matter of course. In addition, in some cases, in order to make the description clearer, the widths, thicknesses, shapes, etc., of the respective parts are illustrated schematically in the drawings, rather than as an accurate representation of what is implemented. However, such schematic illustration is merely exemplary, and in no way restricts the interpretation of the invention. In addition, in the specification and drawings, elements similar to those described in connection with preceding drawings are denoted by the same reference numbers, and detailed description of them is omitted unless necessary.

A disk device will be described. An embodiment where a disk device is applied to a hard disk drive (HDD) will be described.

First Embodiment

Figure 2:
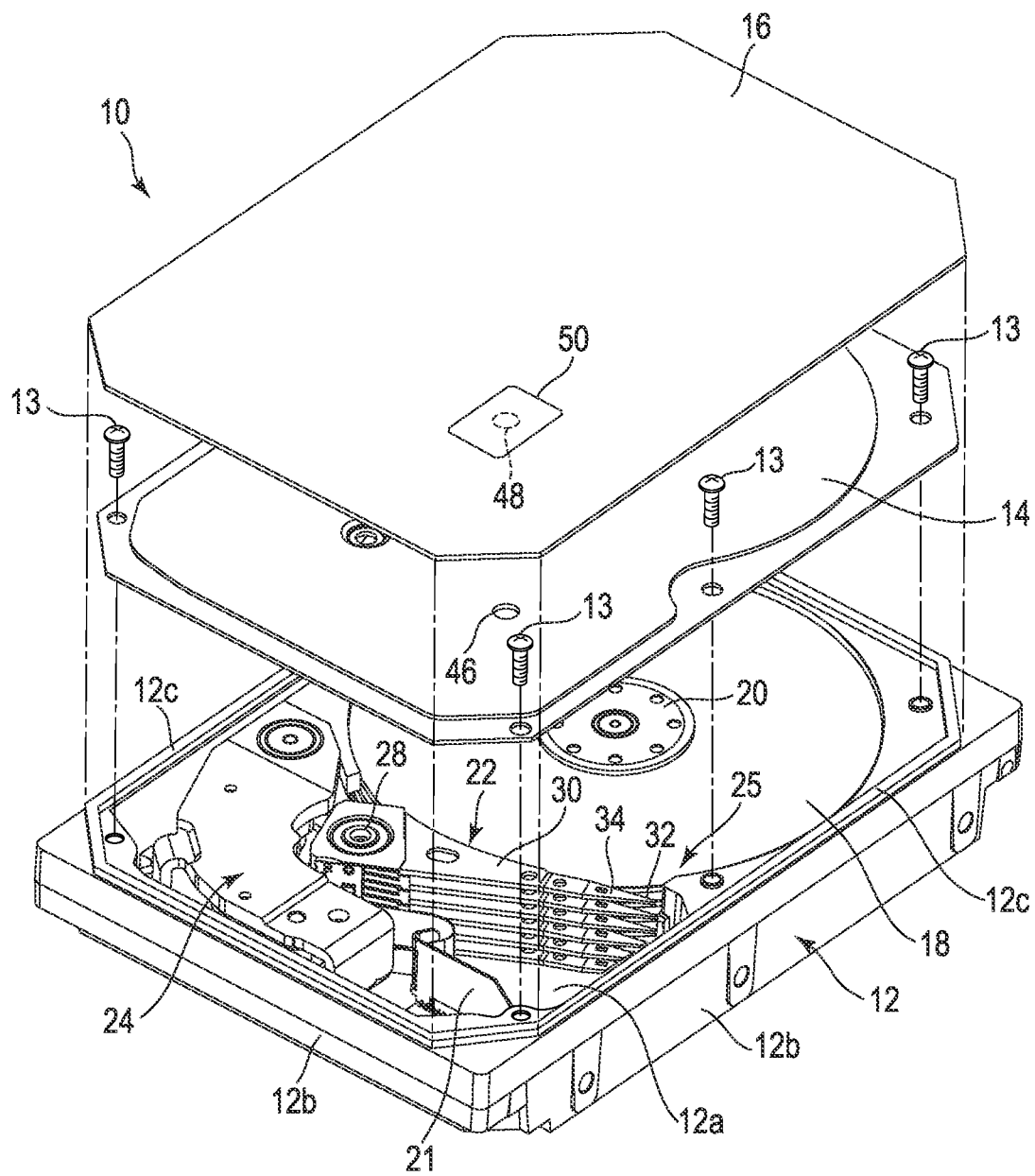
FIG. 2 is an exploded perspective view showing the HDD.

First, the first embodiment will be described. FIG. 1 is a perspective view showing the external appearance of an HDD according to the first embodiment. FIG. 2 is an exploded perspective view showing the internal structure of the HDD.

As shown in FIGS. 1 and 2, the HDD comprises a substantially rectangular housing 10. This housing 10 comprises a rectangular box-shaped base 12 whose top face is open, an inner cover 14 which is fixed to the base 12 by a plurality of screws 13 and closes the top opening of the base 12, and an outer cover (top cover) 16 which is superimposed on the inner cover 14 and whose peripheral portion is welded to the base 12. The base 12 comprises a rectangular bottom wall 12a opposed to the inner cover 14 across a space and a sidewall 12b standing along a periphery of the bottom wall 12a, and is integrally formed of aluminum, for example. The sidewall 12b includes a pair of long side walls opposed to each other and a pair of short side walls opposed to each other. A substantially rectangular frame-shaped fixing rib 12c is disposed protruding from a top surface of the sidewall 12b.

The inner cover 14 is formed in a rectangular plate shape using stainless steel, for example. The inner cover 14 is fixed inside the fixing rib 12c such that its peripheral portion is pressed against the top surface of the sidewall 12b of the base 12 by the screws 13. The outer cover 16 is formed in a rectangular plate shape using aluminum, for example. The outer cover 16 is formed in slightly larger planar dimensions than the inner cover 14. The outer cover 16 is airtightly fixed such that its peripheral portion is welded to the fixing rib 12c of the base 12 over its entire circumference.

Vent-holes 46 and 48 through which the inside and outside of the housing 10 communicate with each other are formed in the inner cover 14 and the outer cover 16, respectively. Air in the housing 10 is expelled through the vent-holes 46 and 48, and a low-density gas (an inert gas) having a lower density than air, for example, helium is sealed in the housing 10 through the vent-holes 46 and 48. For example, a sealant 50 is attached to an outer surface of the outer cover 16 so as to close the vent-hole 48.

As shown in FIG. 2, a plurality of, for example, five to nine magnetic disks 18 as recording medium, and a spindle motor 20 as a drive motor which supports and rotates the magnetic disks 18 are disposed in the housing 10. The spindle motor 20 is disposed on the bottom wall 12a. The magnetic disks 18 each have a diameter of, for example, 95 mm (3.5 inches) and each comprise a magnetic recording layer on their upper surface and/or lower surface. The magnetic disks 18 are each fixed to a hub (not shown) of the spindle motor 20 such that they are each coaxially fitted to the hub and cramped by a cramp spring. Accordingly, the magnetic disks 18 are each supported parallel to the bottom wall 12a of the base 12. The magnetic disks 18 are rotated at a predetermined rotation rate by the spindle motor 20. The magnetic disks 18 are rotatably disposed.

In the present embodiment, five to nine magnetic disks 18 are accommodated in the housing 10. However, the number of magnetic disks 18 is not limited this. In addition, a single magnetic disk 18 may be accommodated in the housing 10.

A plurality of magnetic heads 32 as a plurality of heads which record and reproduce information on and from the magnetic disks 18, and a head stack assembly (actuator) 22 which supports the magnetic heads 32 movably with respect to the magnetic disks 18 are disposed in the housing 10. In addition, a voice coil motor (hereinafter referred to as a VCM) 24 which rotates and positions the head stack assembly 22, a ramped loading mechanism 25 which holds the magnetic heads 32 at an unloading position away from the magnetic disks 18 when the magnetic heads 32 are moved to the outermost circumferences of the magnetic disks 18, and a board unit (first internal wiring member) 21 on which an electronic component such as a conversion connector (first connector) is mounted are disposed in the housing 10. The board unit 21 is composed of a flexible printed circuit (FPC). This FPC is electrically connected to the magnetic heads 32 and a voice coil of the VCM 24 via a relay FPC on the head stack assembly 22. Note that the board unit 21 may be a rigid flexible printed wiring board including both a rigid portion and a flexible portion.

The head stack assembly 22 comprises a rotatable bearing unit 28, a plurality of arms 30 extending from the bearing unit 28, and suspensions 34 extending from the respective arms 30. The magnetic heads 32 are supported on distal end portions of the respective suspensions 34.

Figure 3:
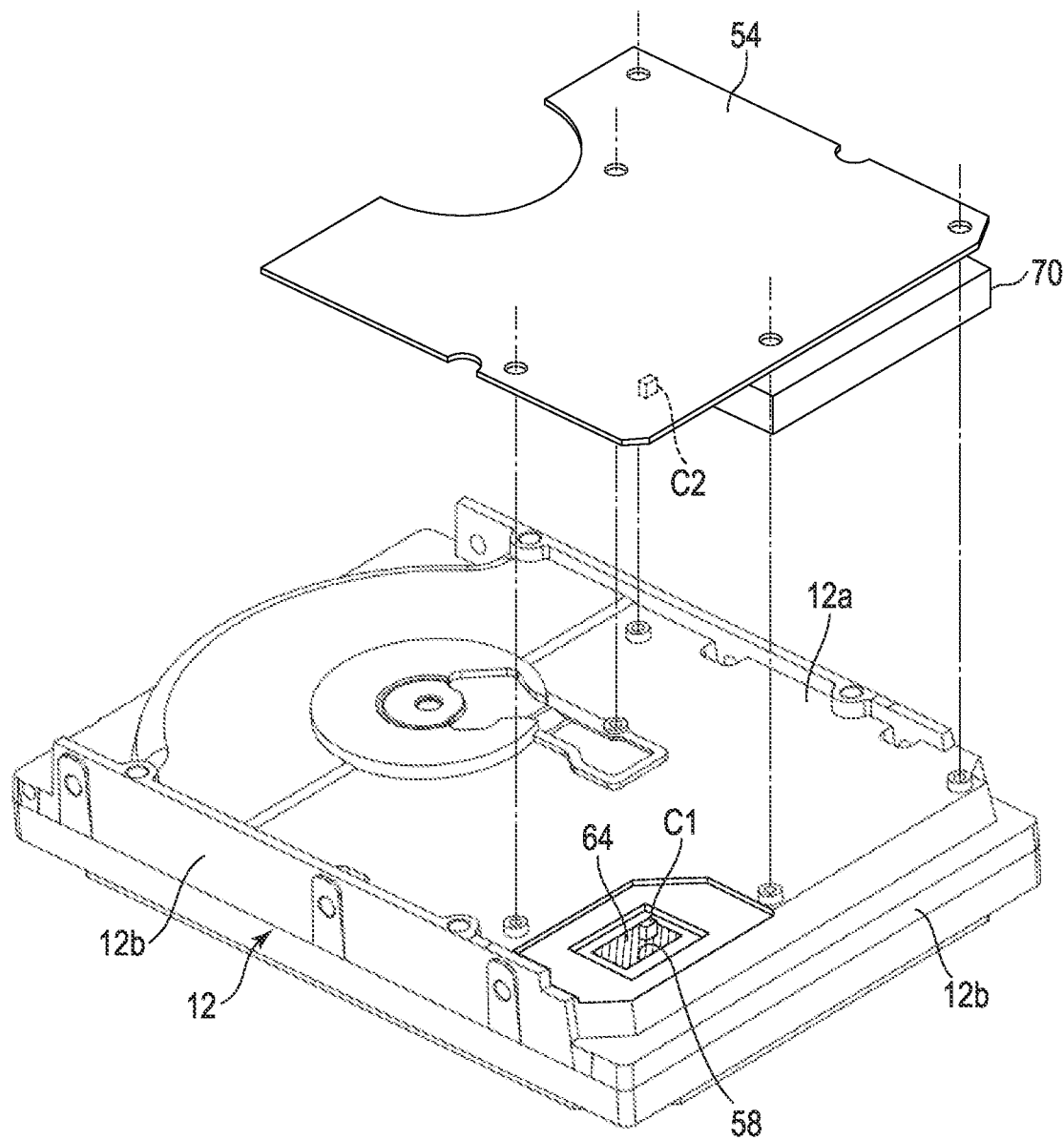
FIG. 3 is an exploded perspective view showing a rear surface side of a base and a control circuit board of the HDD.

FIG. 3 is an exploded perspective view showing a rear surface side of the housing 10 and a control circuit board of the HDD.

As shown in FIGS. 2 and 3, a control circuit board 54 is located outside the housing 10 and is mounted on the housing 10. In the present embodiment, the control circuit board 54 is formed of a printed wiring board (PWB). In addition, the control circuit board 54 is fixed to an outer surface of the bottom wall 12a of the base 12 by screws. The control circuit board 54 controls the operation of the spindle motor 20 and controls the operations of the VCM 24 and the magnetic heads 32 via the board unit 21.

In the bottom wall 12a of the base 12, for example, a rectangular through-hole 58 is formed in an end portion on one short side. The through-hole 58 is opened in an inner surface and an outer surface (rear surface) of the bottom wall 12a. The through-hole 58 is closed by a control board 64. In the present embodiment, the control board 64 is formed of a printed wiring board (PWB).

The HDD further comprises a first connector C1 and a second connector C2. The first connector C1 and the second connector C2 each function as a power supply connector. The control board 64 comprises an outer surface S2 exposed to the outside of the housing 10. The first connector C1 is mounted on the outer surface S2 of the control board 64.

An interface (I/F) connector 70, the second connector C2 and the like are disposed on the control circuit board 54. Note that various memories such as a RAM, a ROM and a buffer memory, a coil, a capacitor and other electronic components are further mounted on the control circuit board 54.

The I/F connector 70 is an example of an external connector. The I/F connector 70 is a connector conforming to an interface standard such as Serial ATA, and is connected to, for example, an I/F connector of a host computer. The control circuit board 54 can receive power supply, receive various pieces of data such as access commands (control signals) such as a write command and a read command, and transmit various pieces of data through the I/F connector 70. In the present embodiment, the control circuit board 54 is wiredly supplied with power from the outside of the HDD, and the control circuit, board 54 wiredly communicates with the outside of the HDD. However, the HDD may be wirelessly supplied with power from the outside, and the HDD may wirelessly communicate with the outside.

Figure 4:
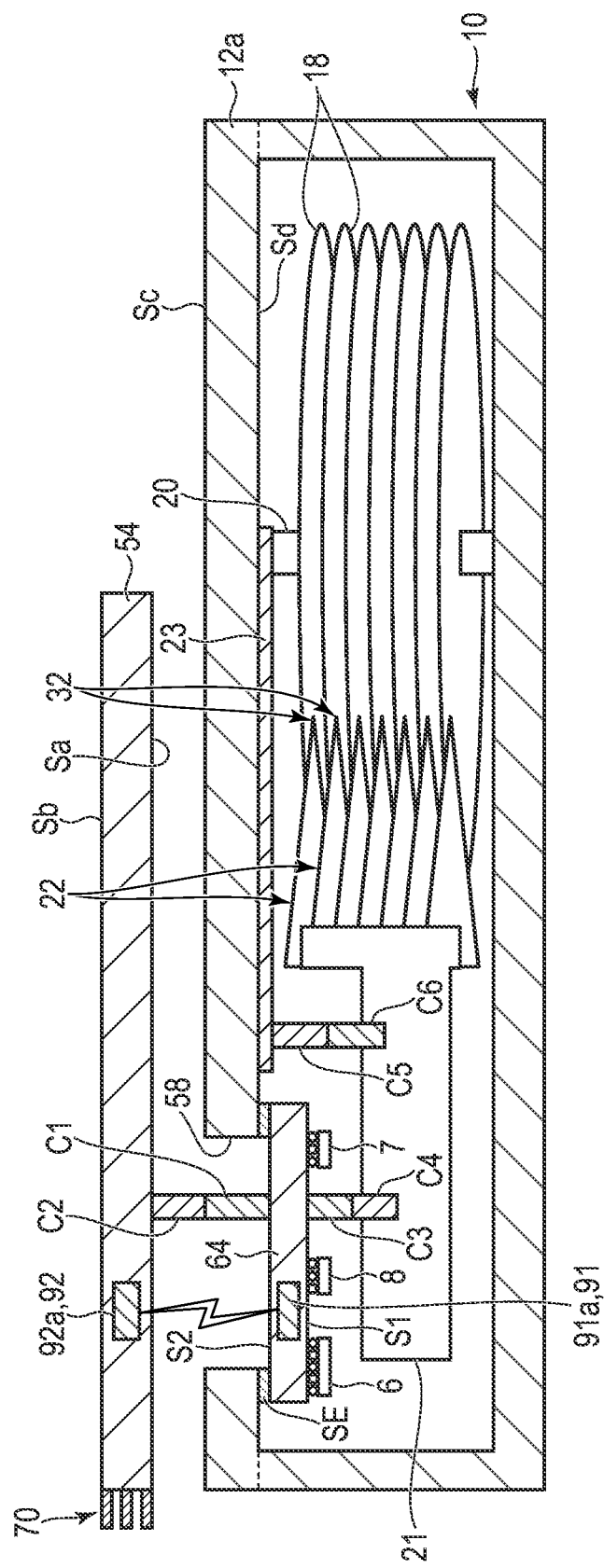
FIG. 4 is a cross-sectional view showing the HDD.

FIG. 4 is a cross-sectional view showing the HDD. As shown in FIG. 4, the through-hole 58 is located on a side of the housing 10 which is opposed to the control circuit board 54, and is formed in the bottom wall 12a. The bottom wall 12a comprises an outer surface (rear surface) Sc and an inner surface Sd.

The control board 64 comprises an inner surface S1 facing the inside of the housing 10 and the outer surface S2 exposed to the outside of the housing 10. The control board 64 is located inside the housing 10. The HDD comprises a frame-shaped adhesive member SE continuously disposed over the entire circumference around the through-hole 58. The adhesive member SE is located between the inner surface Sd of the bottom wall 12a and the outer surface S2 of the control board 64. The control board 64 is bonded to the inner surface Sd of the bottom wall 12a by the adhesive member SE. The control board 64 closes the through-hole 58 together with the adhesive member SE.

Alternatively, the control board 64 may be located outside the housing 10, and the adhesive member SE may be located between the outer surface Sc of the bottom wall 12a and the inner surface S1 of the control board 64. In that case, the control board 64 is bonded to the outer surface Sc of the bottom wall 12a by the adhesive member SE.

The first connector C1 is electrically connected to the control board 64. The second connector C2 is mounted on the control circuit board 54 and is electrically connected to the control circuit board 54. The second connector C2 is connected to the first connector C1. Here, the first connector C1 is one of a pair of connectors which are fitted together, and the second connector C2 is the other of the pair of connectors which are fitted together. In the present embodiment, the first connector C1 is a concave connector (receptacle) and the second connector C2 is a convex connector (plug). The first connector C1 transmits power supplied from the outside of the housing 10 to the control board 64 via the second connector C2 by wired power supply. Note that the HDD may further comprise a secondary battery which is a rechargeable battery inside the housing 10, and accordingly, the power transmitted to the inside of the housing 10 via the first connector C1 and the like can be stored in the secondary battery.

The HDD further comprises a first wireless communication device 91, a second wireless communication device 92, a board unit (second internal wiring member) 23, a CPU 6, a motor control IC 7, a wireless control. IC 8, a third connector C3, a fourth connector C4, a fifth connector C5 and a sixth connector C6.

The first wireless communication device 91 comprises a first communication antenna 91*a*. The first communication antenna 91*a* is located more toward the inside of the housing 10 than the outer surface S2 of the control board 64. In the present embodiment, the first communication antenna 91*a* is formed using a metal layer inside the control board 64. The first communication antenna 91*a* wirelessly communicates with the outside of the housing 10 through the control board 64. The first communication antenna 91*a* only has to be located more toward the inside of the housing 10 than the outer surface S2, and the first communication antenna 91*a* may be mounted on the inner surface S1 of the control board 64 or may be mounted on the board unit 21.

The second wireless communication device 92 comprises a second communication antenna 92*a* and is disposed in the control circuit board 54. In the present embodiment, the second communication antenna 92*a* is formed using a metal layer inside the control circuit board 54. The second communication antenna 92*a* wirelessly communicates with the first communication antenna 91*a* through the control board 64 and the through-hole 58.

The control circuit board 54 comprises an opposed surface Sa opposed to the housing 10 and a rear surface Sb located on an opposite side to the opposed surface Sa. Electronic components other than a connector are mounted on the control circuit board 54. In the present embodiment, the CPU 6, the motor control IC 7 and the wireless control IC 8 are not mounted on the control circuit board 54. In the present embodiment, the CPU 6, the motor control IC 7 and the wireless control IC 8 are mounted on the inner surface S1 of the control board 64. The CPU 6, the motor control IC 7, the wireless control IC 8 and the like each function as an electronic component which assists a control operation for recording and reproducing information on and from the magnetic disks 18.

Since the CPU 6, the motor control IC 7 and the wireless control IC 8 do not have to be mounted on the control circuit board 54, the control circuit board 54 can be downsized. Electronic components other than a connector such as various memories such as a RAM, a ROM and a buffer memory, a coil and a capacitor may also be mounted not on the control circuit board 54 but on the control board 64. Furthermore, an electronic component which controls the operation of the spindle motor 20, an electronic component which controls the operation of the VCM 24 and an electronic component which controls the operation of the magnetic heads 32 may also be mounted not on the control circuit board 54 but on the control board 64.

Since one or more electronic components including the CPU 6, the motor control IC 7 and the wireless control IC 8 are mounted not on the control circuit board 54 but on the control board 64, the control circuit board 54 can be downsized.

Metal portions of the CPU 6, the motor control IC 7 and the wireless control. IC 8 and a metal portion exposed at the inner surface S1 of the control substrate 64 are located in an atmosphere of helium gas. The CPU 6, the motor control IC 7 and the wireless control IC 8 are not mounted on the outer surface S2 of the control board 64. Since the metal portions are not easily affected by oxygen or moisture, the metal portions can be protected, and for example, corrosion of the metal portions can be suppressed.

The third connector C3 is mounted on the inner surface S1 of the control board 64 and is electrically connected to the control board 64. The fourth connector C4 is electrically connected to the board unit 21. The fourth connector C4 is connected to the third connector C3. Here, the third connector C3 is one of a pair of connectors which are fitted together, and the fourth connector C4 is the other of the pair of connectors which are fitted together. In the present embodiment, the third connector C3 is a concave connector and the fourth connector C4 is a convex connector.

The fifth connector C5 is electrically connected to the board unit (second internal wiring member) 23. The sixth connector C6 is electrically connected to the board unit 21. The sixth connector C6 is connected to the fifth connector C5. Here, the fifth connector C5 is one of a pair of connectors which are fitted together, and the sixth connector C6 is the other of the pair of connectors which are fitted together. In the present embodiment, the fifth connector C5 is a concave connector and the sixth connector C6 is a convex connector.

The board unit 21 is electrically connected to the magnetic heads 32. The fourth connector C4 is electrically connected to the magnetic heads 32 and the VCM 24 via the board unit 21.

The board unit 23 is disposed inside the housing 10 and is electrically connected to the spindle motor 20. In the present embodiment, the board unit 23 is composed of an FPC. The board unit 23 may be a rigid flexible printed wiring board. The fourth connector C4 is electrically connected to the spindle motor 20 via the board unit. 23 and the like.

From the above, the magnetic heads 32, the VCM 24, the spindle motor 20 and the like can be driven by power obtained by wired power supply.

According to the HDD of the first embodiment composed as described above, the HDD comprises the housing 10, the magnetic disks 18, the control board 64 and the electronic components (such as the CPU 6, the motor control IC 7 and the wireless control IC 8). One or more electronic components which assist a control operation for recording and reproducing information on and from the magnetic disks 18 are disposed on the control board 64. The HDD capable of increasing the usage efficiency of a space close to the through-hole 58 of the housing 10 can be obtained. In addition, since the number of electronic components mounted on the control circuit board 54 can be reduced, the control circuit board 54 can be downsized.

The first communication antenna 91*a* is located more toward the inside of the housing 10 than the outer surface S2 of the control board 64, and can wirelessly communicate with the outside of the housing 10 through the control board 64. Therefore, the HDD capable of wireless communication can be obtained.

The first connector C1 and the second connector C2 are used as a board-to-board connector (B to B) for connection between the control circuit board 54 and the housing 10 side. However, communication with the electronic components inside the housing 10 may not be wired communication. Since an increase in the number of pins of the first connector C1 and the second connector C2 can be suppressed, upsizing of the through-hole 58 and upsizing of the control board 64 can be suppressed. Consequently, the product design of the HDD will not be limited easily.

Furthermore, the through-hole 58 can be downsized, and leakage of helium gas in the housing 10 can be suppressed. As the size of a connector mounted on the control board 64 increases or the number of connectors mounted on the control board 64 increases, the control board 64 is upsized, and helium gas leaks out of the housing 10 through the control board 64 more easily.

Modification Example 1 of First Embodiment

Next, a modification example 1 of the first embodiment will be described. In the modification example 1, differences from the first embodiment will be described. FIG. 5 is a cross-sectional view showing an HDD according to the modification example 1.

As shown in FIG. 5, the control board 64 may be located inside the through-hole 58. In other words, the control board 64 is located in a region surrounded by an inner peripheral surface of the bottom wall 12a in the through-hole 58. The control board 64 is joined to the bottom wall 12a by an adhesive member or the like (not shown) and airtightly closes the through-hole 58 together with the adhesive member. The HDD does not comprise the first connector C1 and the second connector C2.

The HDD further comprises a first wireless power supply device 81 and a second wireless power supply device 82.

The first, wireless power supply device 81 comprises a first power supply antenna 81a. The first power supply antenna 81a is located more toward the inside of the housing 10 than the outer surface S2 of the control board 64. In the modification example 1, the first power supply antenna 81a is formed using a metal layer inside the control board 64. The first power supply antenna 81a receives supply of power transmitted through the control board 64 and the through-hole 58 by wireless power supply.

The second wireless power supply device 82 comprises a second power supply antenna 82a and is disposed on the control circuit board 54. In the modification example 1, the second power supply antenna 82a is formed using a metal layer inside the control circuit board 54.

Power can be transmitted from the second power supply antenna 82a to the first power supply antenna 81a by wireless power supply. In the modification example 1, the first power supply antenna 81a and the second power supply antenna 82a are opposed to each other across the outer surface S2 of the control board 64 in the region surrounded by the through-hole 58. Therefore, power can be excellently transmitted from the second power supply antenna 82a to the first power supply antenna 81a by wireless power supply.

A part of the power output from the second power supply antenna 82a may be blocked by the housing 10. The first power supply antenna 81a only has to be supplied with at least a part of the power output from the second power supply antenna 82a.

Here, a wireless power supply method will be described. Various known methods can be employed as the wireless power supply method. Examples of the wireless power supply method are an electromagnetic induction method, a magnetic field resonance method, a magnetic field coupling method and a radio wave reception method.

Also in the modification example 1, effects similar to those obtained in the first embodiment can be obtained.

Power may not be wiredly supplied to the electronic components inside the housing 10. A board-to-board connector may not be used for connection between the control circuit board 54 and the housing 10 side. A connector may not be mounted on the control board 64. Accordingly, upsizing of the control board 64 can be suppressed, and for example, the control board 64 can be downsized.

In addition, it is possible to avoid a situation where the manufacturing yield is reduced due to the position accuracy of a connector mounted on the control board 64 such as an angle deviation of the connector or a situation where the development cost of the connector is increased. Since upsizing of the through-hole 58 and upsizing of the control board 64 can be suppressed, the product design of the HDD will not be limited easily.

Second Embodiment

Figure 6:
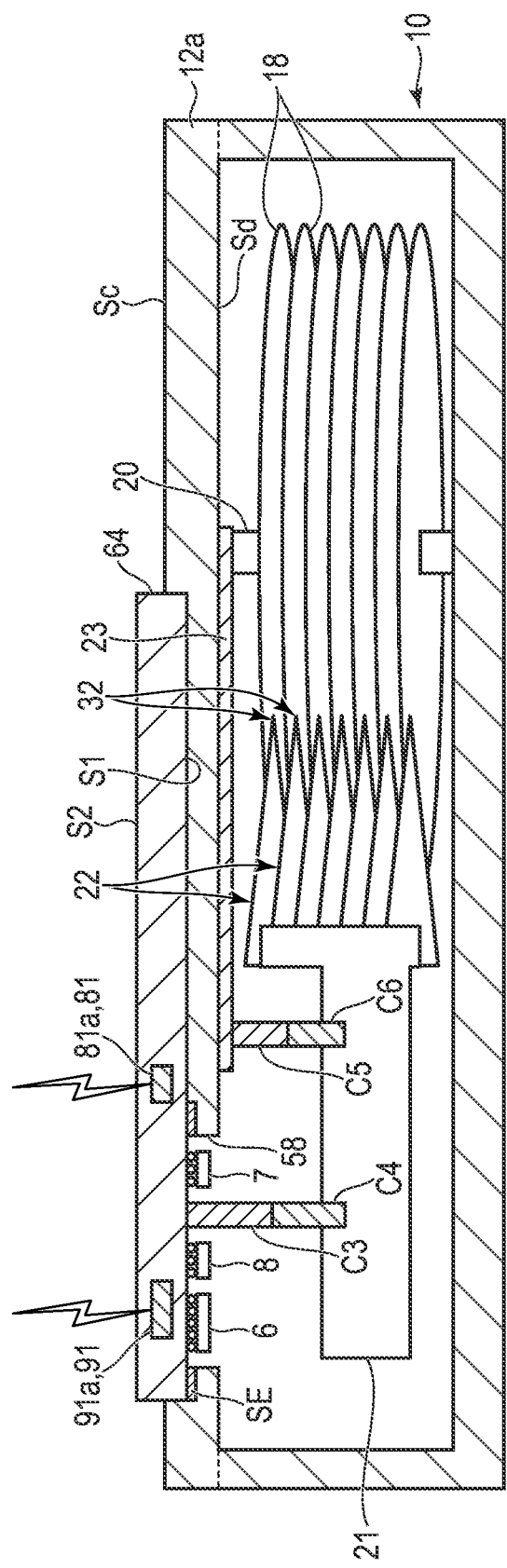
FIG. 6 is a cross-sectional view showing an HDD according to the second embodiment.

Next, the second embodiment will be described. In the second embodiment, differences from the modification example 1 of the first embodiment will be described. FIG. 6 is a cross-sectional view showing an HDD according to the second embodiment.

As shown in FIG. 6, the HDD is composed without the control circuit board 54. Various memories, a coil, a capacitor, and other electronic components are mounted on the control board 64. Since the control circuit board 54 is not used, the thickness of the housing 10 can be increased, and the internal space of the housing 10 can be increased. For example, the number of maanetic disks 18 accommodated in the housing 10 can be increased.

The control board 64 is locaced outside the housing 10. The HDD comprises the frame-shaped adhesive member SE continuously disposed over the entire circumference around the through-hole 58. The adhesive member SE is located between the outer surface Sc of the bottom wall 12a and the inner surface S1 of the control board 64. The control board 64 is bonded to the outer surface Sc of the bottom wall 12a by the adhesive member SE. The control board 64 closes the through-hole 58 together with the adhesive member SE.

The first power supply antenna 81a and the first communication antenna 91a may be located more toward the outside than the outer surface S2 of the control board 64. The first power supply antenna 81a and the first communication antenna 91a may be mounted on the outer surface S2 of the control board 64 or may be mounted on an outer surface of the housing 10 such as the outer surface Sc of the bottom wall 12a.

Also in the HDD of the second embodiment composed as described above, effects similar to those obtained in the modification example 1 of the first embodiment can be obtained. The various memories, coil, capacitor and other electronic components mounted on the control circuit board 54 in the first embodiment are mounted on the control board 64. The HDD can be composed without the control circuit board 54.

Modification Example 1 of Second Embodiment

Figure 7:
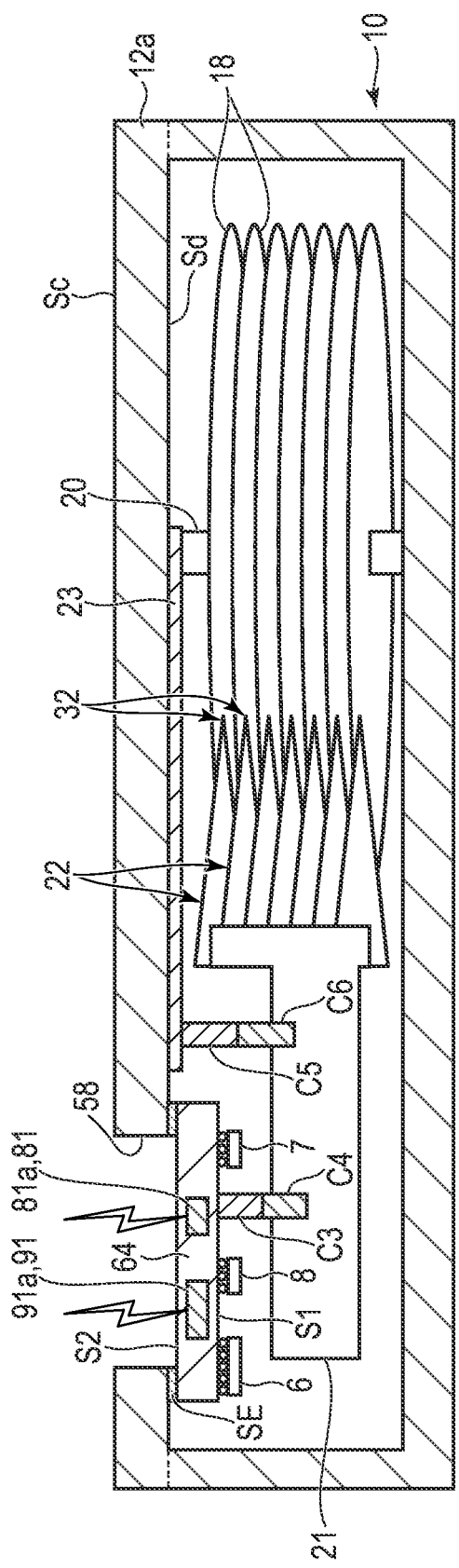
FIG. 7 is a cross-sectional view showing an HDD according to a modification example 1 of the second embodiment.

Next, a modification example 1 of the second embodiment will be described. In the modification example 1, differences from the second embodiment will be described. FIG. 7 is a cross-sectional view showing an HDD according to the modification example 1.

As shown in FIG. 7, the control board 64 may be located inside the housing 10. Then, as shown in the first embodiment (FIG. 4), the control board 64 is bonded to the inner surface Sd of the bottom wall 12a by the adhesive member SE.

Also in the modification example 1, effects similar to those obtained in the second embodiment can be obtained.

Modification Example 2 of Second Embodiment

Figure 8:
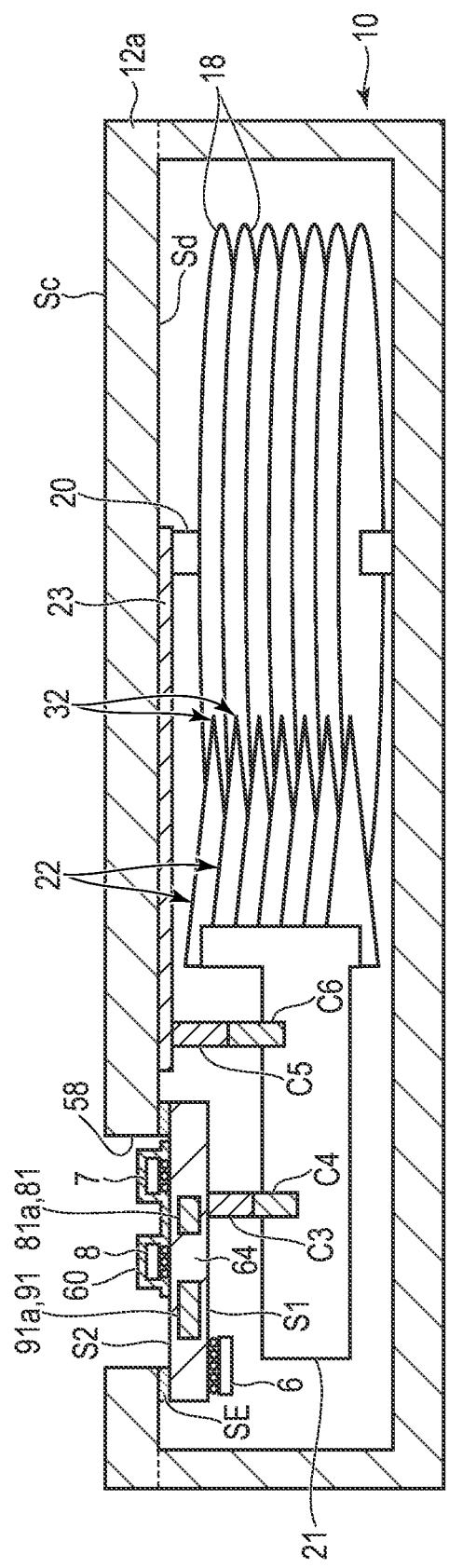
FIG. 8 is a cross-sectional view showing an HDD according to a modification example 2 of the second embodiment.

Next, a modification example 2 of the second embodiment will be described. In the modification example 2, differences from the modification example 1 of the second embodiment will be described. FIG. 8 is a cross-sectional view showing an HDD according to the modification example 2.

As shown in FIG. 8, one or more electronic components other than a connector mounted on the control board 64 may be mounted on the outer surface S2 of the control board 64. In the modification example 2, the motor control IC 7 and the wireless control IC & are mounted on the outer surface S2 of the control board 64.

The HDD further comprises a barrier layer 60. The barrier layer 60 comprises a gas/drip prevention function. The material used for the barrier layer 60 is a coating agent other than a solder resist (ink) generally used for protecting a printed wiring board, and is, for example, HumiSeal (registered trademark).

The barrier layer 60 covers at least a metal portion of the control board 64, and comprises a function of suppressing entry of gas and fluid to the metal portion. In the modification example 2, the barrier layer 60 covers not only the control board 64 but also the motor control IC 7 and the wireless control IC 8. The barrier layer 60 also covers a connection portion of the metal portion of the control board 64 and the electronic component (the motor control IC 7, the wireless control. IC 8). Accordingly, the metal portion and the connection portion are not easily affected by oxygen or moisture, and the metal portion and the like can be protected, and for example, corrosion of the metal portion and the like can be suppressed.

The barrier layer 60 is located on an outer surface S2 side of the control board 64. Therefore, corrosion of the metal portion and the like can be further suppressed.

The barrier layer 60 may be located on an inner surface S1 side of the control board 64 and may cover the metal portion and the like on the inner surface S1 side.

In addition, the barrier layer 60 may individually cover a plurality of metal portions and the like. For example, the motor control. IC 7 and the wireless control IC 8 may be covered with different barrier layers. Alternatively, the barrier layer 60 may cover one or more metal portions and the like.

Also in the modification example 2, effects similar to those obtained in the modification example 1 of the second embodiment can be obtained.

Modification Example 3 of Second Embodiment

Figure 9:
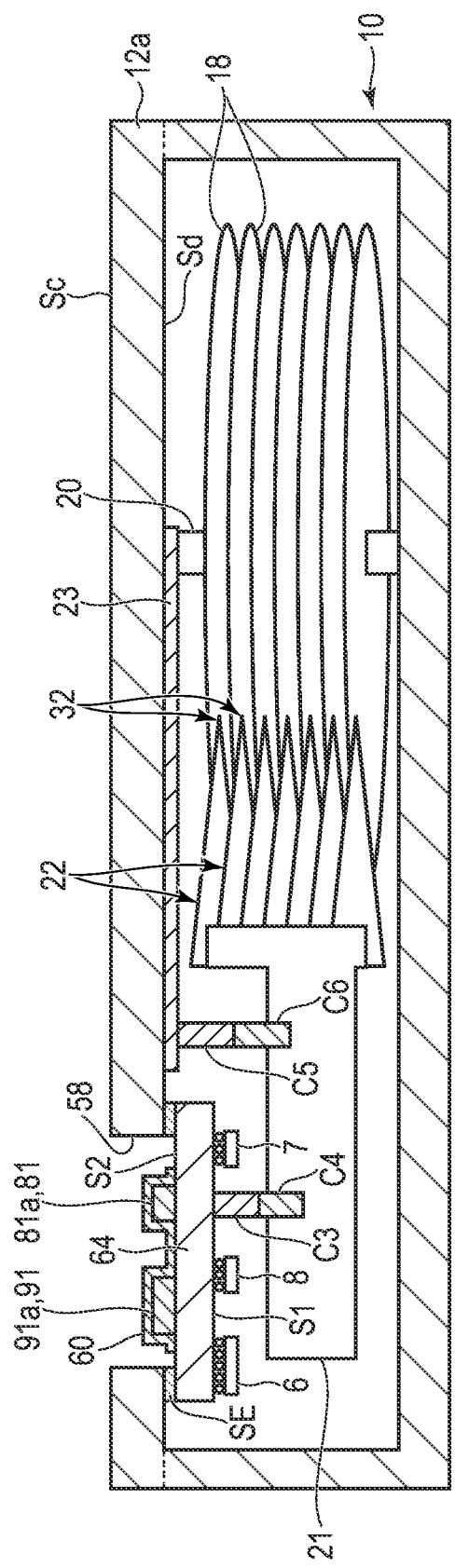
FIG. 9 is a cross-sectional view showing an HDD according to a modification example 3 of the second embodiment.

Next, a modification example 3 of the second embodiment will be described. In the modification example 3, differences from the modification example 1 of the second embodiment will be described. FIG. 9 is a cross-sectional view showing an HDD according to the modification example 3.

As shown in FIG. 9, the first power supply antenna 81a and the first communication antenna 91a are located more toward the outside than the outer surface S2 of the control board 64. In the modification example 3, the first power supply antenna 81a and the first communication antenna 91a are mounted on the outer surface S2 of the control board 64 and are electrically connected to the control board 64.

The barrier layer 60 is disposed on the outer surface S2 of the control board 64, the first power supply antenna 81a and the first communication antenna 91a, and covers the first power supply antenna 81a and the first communication antenna 91a so that the first power supply antenna 81a and the first communication antenna 91a are not exposed to external air. The barrier layer 60 comprises a function of suppressing entry of gas and fluid to the first power supply antenna 81a and the first communication antenna 91a.

The barrier layer 60 is located on the outer surface S2 side of the control board 64. Therefore, corrosion of the first power supply antenna 81a and the first communication antenna 91a located on the outer surface S2 side can be further suppressed.

The barrier layer 60 may individually cover the first power supply antenna 81a and the first communication antenna 91a. Alternatively, the barrier layer 60 may cover one of the first power supply antenna 81a and the first communication antenna 91a.

Modification Example 4 of Second Embodiment

Figure 10:
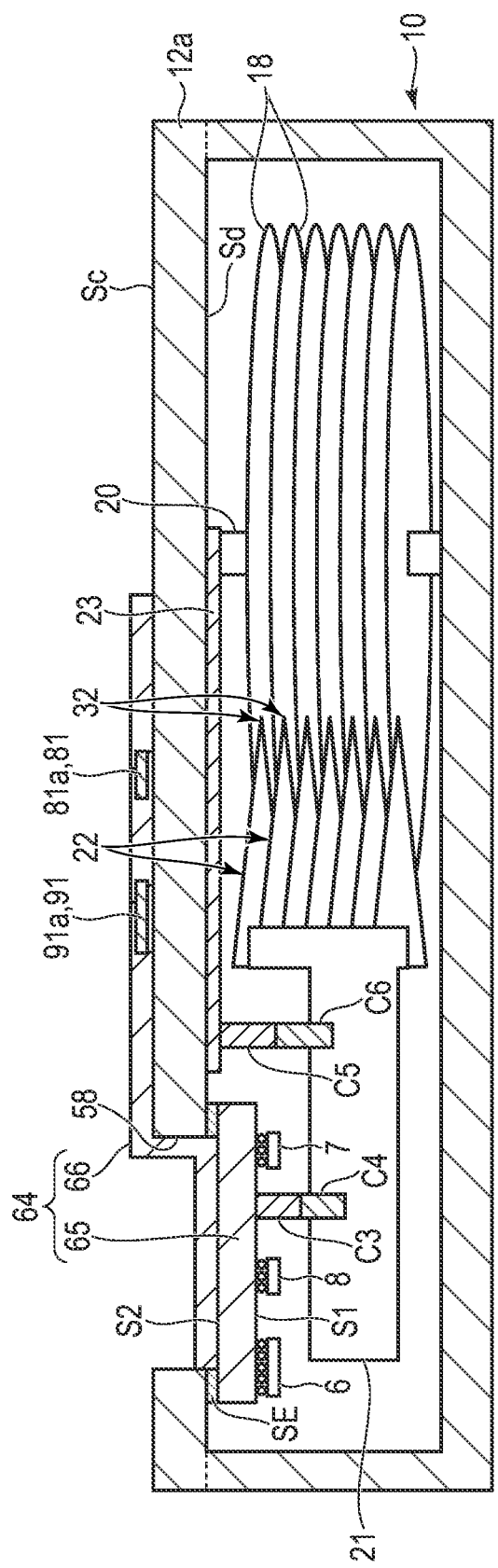
FIG. 10 is a cross-sectional view showing an HDD according to a modification example 4 of the second embodiment.

Next, a modification example 4 of the second embodiment will be described. In the modification example 4, differences from the modification example 1 of the second embodiment will be described. FIG. 10 is a cross-sectional view showing an HDD according to the modification example 4.

As shown in FIG. 10, the control board 64 is a rigid flexible printed wiring board including both a rigid portion 65 and a flexible portion 66. The flexible portion 66 extends to a position opposed to the outer surface Sc of the bottom wall 12a outside the housing 10, and is fixed to the outer surface Sc. The first power supply antenna 81a and the first communication antenna 91a are formed using a metal layer inside the flexible portion 66. The first power supply antenna 81a and the first communication antenna 91a may be mounted on the flexible portion 66. In that case, the first power supply antenna 81a and the first communication antenna 91a may be coated with the barrier layer 60.

Also in the modification example 4, effects similar to those obtained in the modification example 1 of the second embodiment can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the control board 64 may be formed of a printed circuit board (PCB) or an FPC. The control board 64 and the board unit 21 may be integrally formed. For example, when the control board 64 is a rigid portion and the board unit 21 is a flexible portion, the control board 64 and the board unit 21 may be formed of a rigid flexible printed wiring board.

The through-hole 58 closed by the control board 64 may not be formed in the bottom wall 12a. The through-hole 58 may be formed in a part of the housing 10 other than the bottom wall 12a such as the sidewall 12b. The through-hole 58 and the control board 64 disposed in an arbitrary place can be used. For example, the first communication antenna 91a located more toward the inside of the housing 10 than the outer surface S2 of the control board 64 can wirelessly communicate with an external antenna different from the second communication antenna 92a, and the freedom of wireless communication can be increased.

The control board 64 may be fixed to the bottom wall 12a such that it is pressed against the outer surface Sc of the bottom wall 12a by screws with an O-ring surrounding the through-hole 58 sandwiched in between. Alternatively, the control board 64 may be fixed to the bottom wall 12a such that it is pressed against the inner surface Sd of the bottom wall 12a by screws with an O-ring surrounding the through-hole 53 sandwiched in between.

Although the board unit 23 is physically independent of the board unit 21, the board unit 23 may be integrally formed with the board unit 21. In that case, the HDD may not use the fifth connector C5 and the sixth connector C6.

The sizes, shapes and numbers of the first power supply antenna 81a, second power supply antenna 82a, first communication antenna 91a and second communication antenna 92a are not limited to the above-described examples but may be variously modified. For example, the number of first power supply antennas 81a, the number of second power supply antennas 82a, the number of first communication antennas 91a and the number of second communication antennas 92a disposed in the HDD may be greater than or equal to two.

The materials, shapes, sizes and the like of elements constituting the disk device may be changed as needed. In the disk device, the number of magnetic disks and the number of magnetic heads may be increased or reduced as needed, and the size of the magnetic disks may be variously selected. The materials, shapes, sizes and the like of elements constituting the magnetic disk device are not limited to the above-described embodiments but may be variously changed as needed. The gas sealed in the housing is not limited helium but may be appropriately selected from other gases.

What is claimed is:

1. A disk device comprising:
a housing comprising a hole;
a magnetic disk rotatably disposed in the housing;
a control board closing the hole and comprising an outer surface exposed to an outside of the housing;
an electronic component mounted on the control board, the electronic component being a component other than a connector; and
a first wireless communication device comprising a first communication antenna which is located inside the control board and wirelessly communicates with the outside of the housing through the control board.

2. The disk device of claim 1, wherein:
the control board further comprises an inner surface facing an inside of the housing, and
the electronic component is mounted on the inner surface of the control board.

3. The disk device of claim 1, further comprising an adhesive member,
wherein the control board is bonded to the housing by the adhesive member.

4. The disk device of claim 1, further comprising a first power supply connector,
wherein the first power supply connector is mounted on the outer surface of the control board and transmits power supplied from the outside of the housing to the control board by wired power supply.

5. The disk device of claim 1, further comprising:
a first power supply connector; and
a second power supply connector,
wherein:
the control board further comprises an inner surface located on an opposite side to the outer surface and facing an inside of the housing,
the first power supply connector is mounted on the outer surface of the control board,
the second power supply connector is mounted on the inner surface of the control board, and
the first power supply connector and the second power supply connector transmit power supplied from the outside of the housing to the control board by wired power supply.

6. The disk device of claim 1, further comprising:
a control circuit board including an interface connector; and
a second wireless communication device comprising a second communication antenna which is disposed in the control circuit board and wirelessly communicates with the first communication antenna.

7. A disk device comprising:
a housing comprising a hole;
a magnetic disk rotatably disposed in the housing;
a control board closing the hole and comprising an outer surface exposed to an outside of the housing;
an electronic component which is mounted on the control board and assists a control operation for recording and reproducing information on and from the magnetic disk; and
a first wireless communication device comprising a first communication antenna which is located inside the control board and wirelessly communicates with the outside of the housing through the control board.

8. The disk device of claim 7, wherein:
the control board further comprises an inner surface facing an inside of the housing, and
the electronic component is mounted on the inner surface of the control board.

9. The disk device of claim 7, further comprising:
an adhesive member,
wherein the control board is bonded to the housing by the adhesive member.

10. The disk device of claim 7, further comprising:
a first power supply connector,
wherein the first power supply connector is mounted on the outer surface of the control board and transmits power supplied from the outside of the housing to the control board by wired power supply.

11. The disk device of claim 7, further comprising:
a first power supply connector; and
a second power supply connector,
wherein:
the control board further comprises an inner surface located on an opposite side to the outer surface and facing an inside of the housing,
the first power supply connector is mounted on the outer surface of the control board,
the second power supply connector is mounted on the inner surface of the control board, and
the first power supply connector and the second power supply connector transmit power supplied from the outside of the housing to the control board by wired power supply.

12. The disk device of claim 7, further comprising:
a control circuit board including an interface connector; and
a second wireless communication device comprising a second communication antenna which is disposed in the control circuit board and wirelessly communicates with the first communication antenna.

* * * * *